United States Patent
Varma

(10) Patent No.: US 7,056,971 B2
(45) Date of Patent: Jun. 6, 2006

(54) ESSENTIALLY GAS-IMPERMEABLE THERMOPLASTIC ELASTOMER

(75) Inventor: Rajesh Kumar Varma, McHenry, IL (US)

(73) Assignee: GLS Corporation, Arlington Heights, IL (US)

( * ) Notice: Subject to any disclaimer, the term of this patent is extended or adjusted under 35 U.S.C. 154(b) by 438 days.

(21) Appl. No.: 10/074,070

(22) Filed: Feb. 12, 2002

(65) Prior Publication Data

US 2002/0160137 A1    Oct. 31, 2002

Related U.S. Application Data

(60) Provisional application No. 60/268,461, filed on Feb. 13, 2001.

(51) Int. Cl.
*C08L 53/02* (2006.01)

(52) U.S. Cl. .................. 524/490; 524/491; 525/99; 525/62

(58) Field of Classification Search ................ 524/490, 524/491; 525/62, 99
See application file for complete search history.

(56) References Cited

U.S. PATENT DOCUMENTS

| | | | |
|---|---|---|---|
| 4,042,555 A * | 8/1977 | Raimondi et al. .......... 524/505 |
| 4,783,504 A * | 11/1988 | St. Clair et al. ............... 525/72 |
| 5,278,220 A * | 1/1994 | Vermeire et al. ........... 524/490 |
| 5,480,915 A | 1/1996 | Burns .......................... 521/50 |
| 5,731,053 A | 3/1998 | Kuhn et al. .............. 428/369.2 |

FOREIGN PATENT DOCUMENTS

| | | |
|---|---|---|
| EP | 0863193 | 3/1997 |
| EP | 0 863 193 A1 | 9/1998 |
| FR | 2705053 | 5/1993 |
| WO | WO 9729140 | 2/1996 |
| WO | WO 14171 A1 | 8/2000 |

* cited by examiner

Primary Examiner—Jeffrey Mullis
(74) Attorney, Agent, or Firm—Alfred D. Lobo

(57) ABSTRACT

A thermoplastic elastomer ("TPE") which is oxygen-permeable is provided with excellent barrier properties against oxygen by melt-blending with a liquid polyisobutene oil plasticizer in an amount insufficient to render the plasticized elastomer tacky. If made tacky, enough detackifier is used to allow the product to be formed into a removable seal. The TPE may be a conventional thermoplastic vulcanizate or a block copolymer of a vinylaromatic compound, typically styrene, and a conjugated diene, typically butadiene or isoprene, or mixtures thereof; the block may be a diblock, triblock or higher block, but the preferred polyblock copolymer is a triblock with styrene end-blocks and a butadiene/isoprene mid-block. Preferably the diene mid-block is hydrogenated to provide a poly(lower)monoolefin mid-block. When the TPE is a TPV, some or all of the mineral oil used to make the TPV processable may also be substituted with the polyisobutene plasticizer. The elastomeric product is particularly useful for sealing elements for containers in which foods, beverages and medical products must be preserved for a long period.

15 Claims, 2 Drawing Sheets

ESSENTIALLY GAS-IMPERMEABLE THERMOPLASTIC ELASTOMER

CROSS-REFERENCE TO RELATED APPLICATION

This application is claims the benefit of the filing date of the provisional application Ser. No. 60/268,461 filed Feb. 13, 2001.

FIELD OF THE INVENTION

An elastomeric seal, held inside a removable cap (a seal for a bottle cap is narrowly referred to as a "cap liner"), is conventionally thermoformed from a thermoplastic elastomer (referred to as a "TPE") to prevent escape of any portion of the contents of the container, and to prevent contamination from the environment. The term "elastomer" is used herein to refer to a synthetic resinous having elasticity such that a test strip 2.5 cm wide and 2.5 mm thick may be stretched in the range from 5% to 100% of its initial length and still return to its original length; further, such elastomer is necessarily thermoplastic and re-processable.

BACKGROUND OF THE INVENTION

Conventionally used seals in removable closure means for sealing containers, are substantially gas-permeable and therefore ineffective, over a long period of time, greater than six months, to negate the effect of deleterious gases which diffuse through the seals and degrade contents which are sensitive to such gases. Sealing elements or closure liners for such closures are typically molded closures which include twist crowns, crown corks, stoppers, septums for syringe vials, screw caps for bottles jars and the like but may also be gaskets; many of these are made by in-shell or out-shell molding and gaskets may also be cast in-situ.

For in-shell molding, most commonly used, granules of blend are fed into an extruder and a rotating blade cuts the extrudate into a pellet which is dropped into the bottle cap or other closure. The extrudate does not adhere to the blade and the pellet, because of its low "tack", is easily positioned in the cap. A "tacky" blend is one which, when extruded, adheres to the blade. In out-shell molding, the pellet is formed outside of the closure, on a "puck"; the pellet is then positioned in the closure and molded into its final shape. After cooling and hardening of the thermoplastic polymer compound, the shaped seal forming the cap liner is soft enough to be deformable so as to seal the bottle rim when the cap is tightened onto the mouth of the bottle.

Oxygen-containing gases, and molecular oxygen and carbon dioxide in particular, are known to affect the storage life of a fruit juice or drug adversely, despite being tightly sealed in a glass container with a conventional TPE seal. For example, permeation of oxygen through a seal is detrimental to fresh fruit juice even when the containers are stored under atmospheric pressure. The permeation rate increases with pressure. An inert gas blanket which may be sealed in a container at a pressure up to about 2 atm (atmospheres or bar) may be lost through the seal in a tightly secured cap over a period less than six months.

The product of this invention provides a soft seal having a hardness in the range from Shore A 30 to 90, which is essentially gas-impermeable so long as the gas exerts a pressure of less than about 3 atm (or bar). Though the pressure does not affect permeability which is the permeation rate normalized for a 1 mil (2.54 μm) thickness and 1 atm, the permeation rate at 3 atm is so high that it requires an uneconomically thick seal to provide the desired barrier against oxygen permeation. The thermoplastic blend of this invention provides an extrudable, injection-moldable or blow-moldable shaped article of arbitrary shape, most commonly a laminar sheet, consisting essentially of a blend of synthetic rubber and polyisobutene plasticizer; when formed into a seal having specified hardness and/or specified melt viscosity, the seal may be removably secured to the mouth of a container to seal its contents against a damaging concentration of oxygen permeating through the seal.

Sealing a container against leakage of a liquid under relatively low pressure, in the range from about 1 to 3 atm (or bar), either into or out of the container, is a relatively trivial problem compared to providing an essentially gas-tight and penetrant-impermeable seal under the same pressure. Some medical products, such as injectable drugs which are sensitive to reaction with a gas are typically packaged in essentially gas-impermeable bottles and sealed with an elastomeric seal such as a stopper or plug, without a cooperating closure means. For example, the seal, by itself, may be forcibly conformed to the mouth of a container; or the seal may be otherwise held in sealing relationship with the mouth of the container. Permeation of penetrant gas through the body of the container itself, whether a package, jar, bottle or vial containing medication, is easily negated by making the body from a gas-impermeable inorganic material such as glass; or from an essentially gas-impermeable engineering thermoplastic such as a polyamide, ethylene vinyl alcohol, polyvinyl alcohol, polycarbonate, polyacetal, ABS resin, polybutylene terephthalate, polysulfone, aromatic polyester, polyphenylene oxide blend, and the like. However, the leakage of concern in this instance is not that which occurs from around the periphery of a purportedly gas-tight seal, but by gas permeation, that is, by movement of the penetrant into the polymer, diffusion of the penetrant through the polymer, and, desorption and evaporation of the penetrant from the surface of the polymer.

All containers are configured so as to be sealed to minimize the leakage of gas which then becomes trapped in contact with the gas-sensitive product held in the container. It is well known that an essentially gas-impermeable adequately soft and thin TPE cannot now be injection-molded in conventional injection-molding machines economically. Known TPEs which have oxygen-permeability less than 40,000 cc.(2.54 μm)/$m^2$.day.atm, have a hardness greater than Shore A 90 and are too hard to provide easily usable seals. A usable TPE product is defined as a rubbery synthetic resinous material required to have a hardness in the range from Shore A 30 to 90 and lower than the aforestated oxygen-permeability.

The TPE is chosen from (i) a block copolymer of a vinylaromatic compound and a conjugated diene, which optionally, is at least partially hydrogenated, and (ii) a thermoplastic vulcanizate (referred to as a "TPV"). The block copolymer (i) may be a diblock, triblock, tetrablock or star block copolymer, but is typically a triblock of either styrene-butadiene-styrene, or styrene-isoprene-styrene. The TPE (i) is therefore referred to herein, for convenience and brevity, as a "SBS" copolymer. Either (i) or (ii) may be too soft or too hard, before it is plasticized, to be used as a desirable elastomeric product, usable as a removable sealing element in hardness range from Shore 30 A to 90. In either case the starting TPE has an oxygen-permeability greater than 40,000 cc.(2.54 μm)/$m^2$.day.atm at 23° C. which is unsatisfactory. When either (i) or (ii) is too hard, it may be melt-blended with an unreactive polymono(lower)olefin, the olefin having from 2 to 4 carbon atoms, preferably with more than 5% by weight of the TPE. A TPE with unsatisfactory oxygen-permeability is converted to one in which the oxygen-permeability is satisfactory for use as a sealing element when it is plasticized with "liquid polyisobutene", as disclosed herein.

The physical properties of the melt-blended SBS may be modified with a "plastic" polymer, typically an α-β monoolefinically unsaturated hydrocarbon polymer, and in addition, optionally, a rubber, each of which is a non-reactant relative to the other and to the TPE; typically, the plastic and rubber are non-crosslinkable with sulfur, peroxides and other conventional crosslinking agents. TPE seals are typically essentially inert, that is, unreactive with either the contents of the container or with inorganic or organic liquids or gases in the environment.

Starting TPEs are known TPVs and SBSs. Most preferred is a SBS which is a tri-block copolymer having either a poly(diene) or a poly(monoolefin) mid-block ("M-block") and vinylaromatic, preferably polystyrene end-blocks ("S-blocks"). There is need for a practical, readily deformable, sufficiently oxygen-impermeable seal which would provide an effective barrier against permeation of oxygen through a cross-section of material less than 10 mm thick, preferably less than 5 mm thick, over a long period of time in the range from about 1 to 10 years.

It is self-evident that a conventional TPE seal in a sufficiently very large thickness (cross-section) will be essentially gas-impermeable, but it is equally self-evident that it is impractical and uneconomical to provide a seal or a liner in such sufficiently very large thickness.

The problem is to provide an injection-moldable, soft and flexible, essentially gas-impermeable TPE seal, usable in a thickness in the range from about 0.1 mm to 10 mm, which is effective as a barrier against the permeation of a deleterious gas through the seal. An effective seal provides both, an adequately low permeation rate and also an adequately low transmission rate. The lower the permeation rate, the lower the transmission rate and the better the barrier properties. For the purpose at hand, only the oxygen permeation rate and oxygen-permeability is considered because of its particular importance. Permeation rate is measured over the actual thickness of the cross-section of polymer. Factors which affect permeation rate are temperature, relative humidity, material thickness, pressure which is usually barometric pressure, and time. Permeability is the same measurement normalized for a thickness of 2.54 µm (1 mil or 0.001 inch) and 1 atm; or, $cm^3.(2.54 \mu m)/m^2.day.atm$; that is, $cm^3$ of oxygen per 2.54 µm cross-section/$m^2$ per day.atmosphere. A TPE having sufficiently low gas-permeability will provide a solution to the problem and ensure that the contents of the container will have a desired greatly extended shelf-life relative to the shelf-life obtained with currently used TPE seals.

Polybutene, whether homo- or copolymers of isobutene, 1-butene (α-butylene) and/or 2-butene (β-butylene, whether cis- or trans-) irrespective of the ratio of the repeating units, and polymers of higher alkenes having from 5 to about 8 carbon atoms ("poly(higher)alkenes"), are typically rubbery solids. But such rubbers, by themselves have unsatisfactorily high oxygen-permeation rates. Since a thin seal of an adequately deformable block copolymer, formed of S-blocks and a M-block of a conjugated diene, or, of a mono(lower)olefin, and no harder than Shore A 90, provides an unsatisfactorily high oxygen-permeation rate, it is not surprising that a rubbery poly(higher)alkene would also provide a comparably unsatisfactory oxygen-permeation rate.

To combat the unsatisfactory baffler properties of butyl rubber, U.S. Pat. No. 5,731,053 to Kuhn teaches that the butyl rubber is to be heterogeneously blended with high density polyethylene (HDPE) or mixtures of HDPE with another polyolefin, so that areas enriched in butyl rubber alternate with areas enriched in the polyolefin. Kuhn also teaches that good barrier properties are obtained with a 50/50 blend of medium density polyethylene (MDPE) and butyl rubber but the blends fail in a headload test. He failed to note that when sufficient polyolefin is added to SBS rubber to improve permeability of the blend, the hardness of the blend is unacceptably high, typically higher than Shore A 90.

A liquid homopolymer of isobutene (isobutylene) is commercially available, and an isobutene-co-butene copolymer, in which butene is present in a minor molar proportion, may also be produced as a liquid. The homo- and copolymer are together referred to as "polyisobutene" herein. Its manufacturer teaches applications of the liquid polymer in adhesives. The text of those teachings are set forth in full below:

Adhesives

The advantages offered by polybutenes when compared to mineral oils include low colour and excellent colour stability, good resistance to oxidation, practically no toxicity, and a wide range of viscosities. More significant however is the ability of the highly tacky grades (e.g. Indopol H-300 and H-1900) to partially or totally replace relatively expensive tackifier resins, thereby reducing formulation costs. Polybutenes are used to modify a variety of polymers and rubbers in adhesive formulations, exhibiting excellent compatibility with the non-polar types. Polybutenes can also be used in polar rubbers such as nitrile and polychloroprene, but the addition of natural rubber may be necessary to improve the compatibility.

Pressure-Sensitive Adhesives

In laboratory studies of PSA, polybutene improved the quick stick and peel strength of elastomers such as polyisobutene, styrene-isoprene-styrene block copolymers, and styrene-butadiene rubber. Raw material costs can be lowered as polybutene partially replaces tackifiers used in pressure sensitive adhesive formulations. Examples of these adhesives which can be improved with polybutene include adhesives for paper laminates, labels and tapes, masking and friction tapes, surgical tapes, colourless adhesives, cements for leather, paper foil and fibre lamination and industrial tapes.

Polybutene emulsions made using nonionic surfactants decrease the organic vapour emissions in water-based PSAs. These emulsions offer enhanced adhesion and temperature stability and can lower adhesive costs for packaging labels and product assembly.

Hot-Melt Adhesives

When incorporated into hot melts, polybutene acts as a polymer extender, plasticizer, tackifier, and wetting agent. Polybutene decreases the melt index and increases the cold temperature flexibility. Compatible adhesive resins include butyl rubber, styrene-isoprene-styrene copolymers, ethylene vinyl acetate, polyurethane, and low density polyethylene. The major applications for these HMAs include packaging, disposable soft goods, book binding, carton sealing, carpet, shoes and furniture.

In multi-layer food packaging applications, a barrier resin bonds to a substrate which can be rigid or flexible. Coextrusion of the adhesive tie layer, barrier resin, and substrate bonds the dissimilar resins during processing. Polybutene improves the tack and adhesion of the tie layer and can reduce formulation costs. Food packaging applications using a hot melt extrudable adhesive include cups, trays, plates, bags and lid films. Most Indopol grades have food contact approval.

Hot-melt Pressure-Sensitive Adhesives

Indopol polybutene plasticizes many elastomers used in hot-melt pressure sensitive adhesives. Examples include natural rubber, styrene-butadiene rubber, alpha olefin and butyl rubber.

Polybutene enhances the tack and quick-sticking properties of thermo-plastic elastomers which exhibit negligible inherent tack. Adjusting the relative concentration of polybutene can tailor hot melt PSAs for a variety of end uses."

In view of the fact that a sealing element for a closure means, such as a bottle cap, must be removable to use the contents of the bottle, improving the adhesion of the seal to the mouth of the bottle is contraindicated. But improving adhesion is what one would expect to do by adding polyisobutene to an elastomeric seal. There is nothing to suggest that one should add polyisobutene to improve adhesion with the specific intention of finding a way to negate the adhesive effect obtained by use of the polyisobutene plasticizer.

Any gas, inert with respect to polyisobutene, and an oxygen-containing gas in particular, may be bubbled through liquid polyisobutene because the gas is substantially insoluble in it, as long as the pressure of the gas is greater than the hydrostatic head exerted by the liquid. Therefore it is particularly unexpected that when the liquid polyisobutene is blended into an elastomer, the blended liquid forms an effective barrier to flow of the gas through the blend.

Since (S-block)-(M-block)-(S-block), polybutene rubbers and conventional TPVs in the hardness range Shore A 30 to 90 are inadequately effective gas barriers there was no reason to expect that a liquid polyisobutene in combination with either a SBS or a TPE might discharge that function far more effectively. The polyisobutene manufacturer's own teachings, categorizing polyisobutene as a plasticizer, fail to suggest that a SBS or, any TPV, thermoformed in a thickness which by itself is substantially gas-permeable to an oxygen-containing gas, when blended with the liquid polyisobutene, then thermoformed into the same thickness, should provide a modified SBS or TPV which is essentially gas-impermeable. By "essentially gas-impermeable" is meant that the polymer has an oxygen-permeability of less than 15,000 cc.(2.54 µm)/m$^2$.day.atm, as measured with a Mocon Instrument as described in greater detail below. A comparable measurement may be made by the procedure described in ASTM D 3985-81 but the value for an equivalent oxygen permeability has not been determined.

Still further, it is generally found that a blend of SBS and the polyisobutene plasticizer results in too low a melt viscosity, and so soft and deformable a composition that it does not provide a "basic blend" suitable for a satisfactory "basic seal". To provide desirable properties for a basic blend usable as a removable seal, it was necessary to "harden" a too-soft and therefore unusable composition without sacrificing its homogeneity. By "unusable" is meant that pressure exerted by a cap on the seal causes the cross-section of that portion of the seal in contact with the cap to decrease more than 20% because the TPE is too soft; or, that pressure exerted by the cap fails to provide a gas-tight seal at the mating surfaces of seal and container because the TPE is too hard. Therefore, when too soft, it is essential to use an adequate amount of a hardener or a melt index modifier which is compatible with the polyisobutene-plasticized SBS, the amount being sufficient to provide a combination of desirable hardness, preferably in the range from about Shore A 50 to Shore A 85, and oxygen-permeability less than 20,000 cm$^3$.(2.54 µm)/m$^2$.day.atm at 23° C. Most preferably the hardener contributes to enhancing oxygen-barrier properties rather than diminishing them, that is, increasing oxygen-permeability. Though a too-soft polyisobutene-plasticized TPV may also be hardened the amount of hardener may be minimized or zero if a TPV starting material having the appropriate hardness is selected.

In addition, when a substantial amount of polyisobutene, more than 50 phr (parts per 100 parts of TPE), is used in combination with sufficient "hardener" to prepare a desired basic blend, it is typically undesirably tacky for general use. The basic blend is therefore detackified with an appropriate detackifier adapted to bloom to the surface of the thermoformed "detackfied blend", to provide a "detackified seal".

Though one might expect that, like polyisobutene, polymers of other acyclic alkenes, whether branched or substantially straight-chained, having from 5 to 8 carbon atoms and a number average molecular weight ("Mn") in the range from about 200 to 6000, would decrease oxygen-permeability substantially when blended into a TPE, they do not.

U.S. Pat. No. 5,480,915 discloses an unplasticized "cork" molded from a styrene block copolymer and a blowing agent which purportedly "does not permit passage of oxygen into the container" (see Abstract) and notes that prior art closures "have exhibited a tendency to noticeably taint the product and/or offer low resistance to oxygen permeation into the container." (see col 1, lines 48–50). Since the block copolymer itself has inadequate oxygen-permeability (as is evident in the illustrative examples herebelow) the passage of oxygen appears to be inhibited mainly by the longitudinal axial length, that is, the permeation rate through the "cork". Though the product which may contain about 2% polypropylene "offers high resistance to oxygen permeation and produces little or no product tainting." (see col 2, lines 26–27) there is no indication of the permeability of the block copolymer blend though it is clear that the small amount of polyolefin does not substantially affect the hardness of the styrene block copolymer. Despite the blowing agent, the Durometer hardness of the plug is stated to be in the range from Shore A 65 to 80.

SUMMARY OF THE INVENTION

It has been discovered that a polyisobutene oil plasticizer through which air under pressure sufficient only to overcome the hydrostatic head of liquid may be bubbled at ambient temperature of 23° C., is miscible with either (i) a vinylaromatic-polyolefin polyblock copolymer, ("SBS"), optionally hydrogenated to provide a block of a mono(lower)olefin, having Mn in the range from about 40,000 to 1,100,000, or (ii) a TPV having a Shore-A 30–100 hardness, tensile at 100% elongation in the range from about 0.5 to 10 MPa and specific gravity in the range from 0.9 to 0.99, to produce a blend having a hardness in the range from Shore A 30 to 90, preferably Shore A 40 to 80; though TPEs commonly used for sealing elements typically have oxygen-permeability greater than about 40,000 cc.(2.54 µm)/m$^2$.day.atm at 23° C., the polyisobutene-plasticized TPE is essentially gas-impermeable when blended with enough polybutene oil to provide the desired hardness but not enough to make the blend unusably "tacky". To make a desirable elastomeric product a starting TPE is melt-blended with from about 20 to 180 phr fluidizable polybutene (parts per 100 parts of TPE only) having sufficiently low Mn to be fluid during melt-blending of the TPE. When the TPE is SBS it may be melt-blended with or without a blowing agent; and preferably, it is melt-blended with more than 5% by weight of a polymono(lower)olefin.

When the TPE is a SBS, it is most preferably a triblock having polystyrene end-blocks and a mid-block of a conjugated diene, optionally hydrogenated to provide a mid-block of a mono(lower)olefin, ("SBS"). Preferably, the SBS is blended with from about 10 to 150 phr of a polymonoolefin melt index modifier or "hardener", optionally in combination with a monoolefinic rubber having a melt index greater than 0.2 gm/10 min at 230° C. under a load of 2.16 Kg (300 KPa) (ASTM D1238). The preferred hardener is a polymer of a monoolefin having from 2 to 8 carbon atoms, and may be either amorphous or substantially crystalline, syndiotactic or isotactic, the latter being most preferred; e.g. polypropylene having a melt index in the range from 0.2 to 200 gm/10 min as determined by ASTM D1238.

When the TPE is a TPV, the 10% to 60% by weight of mineral oil conventionally used to plasticize the TPV to make it processable, may be replaced with polyisobutene to provide unexpectedly lower oxygen-permeability. Only TPVs formed with non-polar rubbers, such as the vulcanizates of a crystalline α-olefin polymer and EPDM (ethylene/propylene/diene monomer rubber), are effectively plasticized by polyisobutene; TPVs formed with polar rubbers are not.

A "basic blend" of polyisobutene-plasticized SBS, preferably a triblock in which the mid-block is isoprene/butadiene hydrogenated in heterogeneous relative order, or TPV, is uniquely adapted to be used as a deformable, thin, essentially gas-impermeable "basic seal" having a cross-section in the range from about 0.5 mm to 10 mm thick, and controllable tackiness. The seal may be used with or without a cooperating closure means removably disposed in sealing engagement with a container so long as the seal has a hardness in the range from about Shore A 30 to 90.

It is essential that the amount of polyisobutene plasticizer used be insufficient, relative to the amount of TPE, so as to render the plasticized TPE-blend unusable as a seal though the blend may be usable as an adhesive. When the amount of polyisobutene used is sufficient to cause the seal to adhere to the container so as to be removable with difficulty, or not removable without damaging the elastomer, it is found that the tackiness of the seal may be negated by adding an appropriate detackifier to the blend, as evidenced by the absence of an additional glass transition temperature (Tg) attributable to it. The addition of the detackifier also suppresses bleeding of the polybutene from the thermoformed blend during the shelf-life of the contents of the container. The degree of tackiness or "tack" tolerated in a product depends upon its usage; use of the polyisobutene-plasticized blend as a stopper, e.g. a "cork" for a bottle, whether the cork is to be removed with a cork-screw or with one's fingers, will be expected to have different tack specifications compared to use of the blend as a cap liner or to seal a syringe vial.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
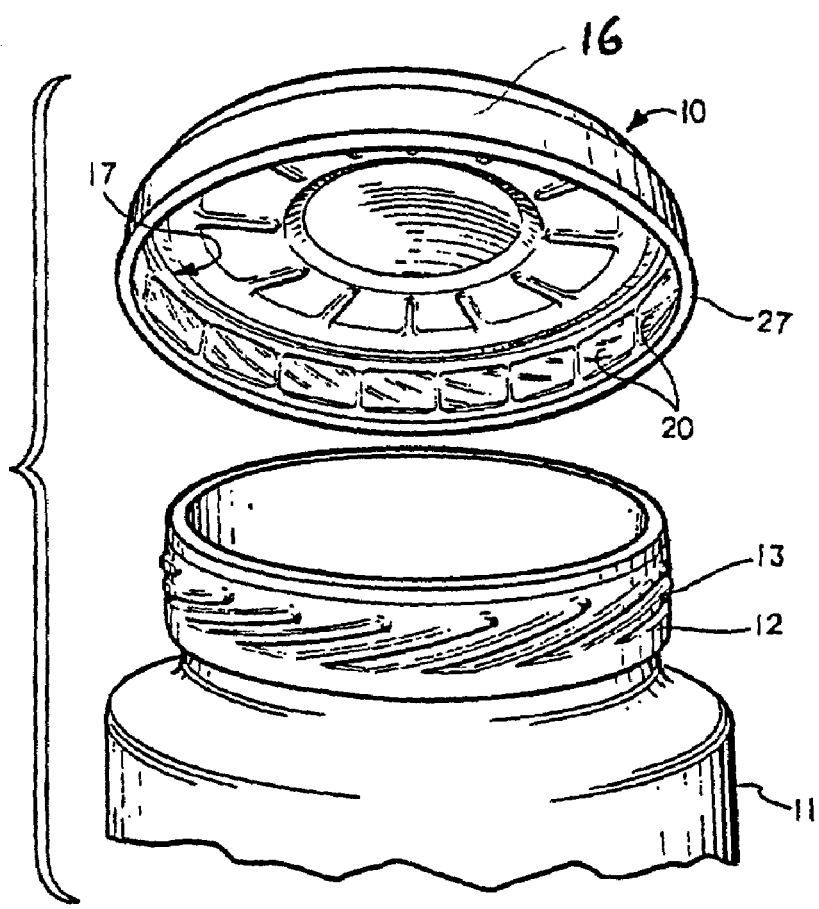
FIG. 1 is a perspective view diagrammatically illustrating a prior art bottle cap in which a cap liner molded using the blend of this invention, is snugly fitted within the periphery of the cap.

Moisture, inorganic gases such as oxygen, carbon dioxide, sulfur dioxide, ammonia and nitrogen, and organic gases such as methane and ethylene are among common gases which tend to leak either into or out of inadequately sealed containers and deleteriously affect contents of the containers because of the reactivity of the gases over a long period. Leakage of air into a container results not only in contact of oxygen with the product but also growth of living organisms such as bacteria. Oxygen is the most common detrimental gas because most solid and liquid foods are oxidized over time. Products are therefore sealed against leakage of such gases into the containers. Where a product is sealed under nitrogen, it is desirable to prevent the nitrogen from escaping. Thus the blended TPE is useful to form seals for bottle caps whether of the pressure-crimped or screw-on type; and for liners of cartons which by themselves are highly permeable to gases even under atmospheric pressure, but which cartons provide the mechanical strength to contain the product therewithin. Because a desirable blend typically has oxygen-permeability lower than 30,000 cc.(2.54 μm)/m$^2$.day.atm at 23° C., preferably in the range from about 2,000 to 15,000 cc.(2.54 μm)/m$^2$.day.atm at 23° C., sealing elements made from the blend exhibit excellent resistance to transmission of carbon dioxide, nitrogen, water vapor.

SBS and TPV sealing elements are currently used in food packaging and medicinal products because they are sufficiently soft and flexible so as to form effective seals. Though such seals may effectively preclude leakage of gas from around the periphery of the seal, the TPE itself is insufficiently gas-impermeable when thermoformed in an arbitrarily thin seal, typically having a thickness in the range from about 0.1 mm to about 10 mm. A thin TPE of appropriate hardness, whether (i) an SBS or (ii) a TPV, when plasticized with enough polyisobutene to provide substantially decreased oxygen-permeability provides a reliable and rugged, essentially fluid-impermeable seal for a conventional container, or an inner liner for a conventional package or drum, without sacrificing softness and flexibility.

When the polyisobutene plasticizer is present at a low level, from about 10 to 50 parts by weight of plasticizer per 100 parts of SBS, the "basic seal" need not be detackified to be removable, because of the presence of the polyolefin hardener; the non-detackified basic blend nevertheless has an oxygen-permeability less than 20,000 cc.(2.54 µm)/m².day.atm at 23° C. An oxygen-permeability of 35,000 cc.(2.54 µm)/–m².day.atm at 23° C. is deemed marginally acceptable for better shelf life than currently available with seals for food products such as fresh orange juice. The non-detackified basic seal may be used in combination with a closure means to seal a container's mouth; the basic seal, by itself, may be used as a thin flexible cap, from about 0.5 mm to about 2 mm thick, forcibly fitted over the mouth of a glass container. The seal may be a stopper for a serum bottle or a metal-enclosed septum for an injectable drug. The septum is formed in a thickness which is easily penetrated by a hypodermic needle.

To tailor the melt index and hardness of either a "basic blend" or a "detackified blend" it is preferred to add a polymono($C_2$–$C_4$) olefin hardener having a melt index in the range from 0.5 to 50 gm/10 min (ASTM D1238), in combination with from 0 to 20 phr of a polymono($C_2$–$C_4$) olefin rubber having Mn in the range from 200,000 to 1,000,000, the amount of hardener used being readily compatible in the block copolymer/plasticizer blend and sufficient to provide the desired melt index and releasability. Addition of from 1 to 20 phr detackifier improves releasability without substantially affecting hardness or solution viscosity.

The "basic seal" using either a SBS or a TPV, most preferably contains a high level of polyisobutene, from above 30 to about 100 phr (parts by weight per 100 parts of TPE); the resulting blend is required to be detackified with an appropriate detackifier, preferably from 1 to 20 phr. The resulting detackified resin composition may be thermoformed into a "detackified seal" for general use as a seal in a removable closure means, or into a collapsible liner for a container, for example, a bag for a fiber drum.

To prepare a preferred blend of this invention it is essential to start with a TPE having a hardness no lower than that of the desired polyisobutene-plasticized TPE, preferably in the range from Shore A 50 to 85, and to blend in the amount of polybutene and hardener, found by trial and error, to yield a blend with the desired properties and gas-impermeability.

In one embodiment, the SBS blend consists essentially of a styrene-mono(lower)olefin-styrene, or, styrene-isoprene-styrene, or, styrene-butadiene-styrene block copolymer having a hardness in the range from at least Shore A 30 up to 90; liquid polyisobutene oil having Mn in the range from about 200 to 6000; and, from 20 to 100 phr (parts by weight per 100 parts of block copolymer) of polyolefin hardner; such a blend is thermoformable to provide a removable seal with a 0.5 mm to 10 mm thick cross-section, usable in combination with or without a closure means for sealing a container. From 0 to 100% of the vinyl unsaturation in the block copolymer may be hydrogenated, and preferably the triblock copolymer is partially, that is, 50% to 85%, or fully hydrogenated to provide better stability, weatherability and ozone resistance.

Most preferably, the SBS is a styrene-ethylene-butylene-styrene ("SEBS") copolymer, or a styrene-ethylene-butylene copolymer, and has Mn in the range from about 80,000 to about 500,000; and the SBS is blended with a liquid polybutene having a major molar proportion of isobutene repeating units relative to the butene repeating units, preferably all isobutene units, the polyisobutene oil having Mn in the range from about 1000 to 4000; the polyisobutene is preferably present in the range from about 20 to 100 phr (parts per 100 parts by weight of SBS) and the elastomeric product is light-permeable so as to be able to read a legend inscribed under the product.

In another embodiment, the TPV blend consists essentially of a vulcanizate of isobutyl or EPR or EPDM rubber and a poly(lower)monoolefin, in which blend at least 10 phr, preferably 20 phr, and most preferably all of a mineral oil conventionally used to render the TPV processable, is substituted with polyisobutene oil. A preferred commercially available TPV is a partially or fully crosslinked dynamic vulcanizate of 60–85 phr ethylene-propylene-diene rubber and correspondingly, 40–15 phr polypropylene which TPV is not hydrogenated. Such a starting TPV is chosen with a hardness in the range from Shore A 30 to 100 so that upon melt-blending with polyisobutene and, optionally additional polyethylene or polypropylene, the product has the desired hardness and oxygen permeability. The amount of polyisobutene used is sufficient to provide a blended-TPV hardness in the preferred range from Shore A 50 up to 85; preferably the liquid polyisobutene oil has Mn in the range from about 2000 to 6000. Most preferably, the TPV has a tensile at 100% elongation in the range from about 1 to 5 MPa, and is blended with a liquid polyisobutene having the aforementioned limitations.

To provide desired melt index and to "harden", that is, overcome undesirable softness, the blend of triblock copolymer and polybutene typically exhibits two distinct Tgs unless the molecular weights of the mid-block and end-block are so close that there is an overlapping of the Tgs. An unusable, too-soft blend with a too-low melt index may be blended with a normally solid thermoplastic poly(mono)olefin having a melt index greater than 0.2 gm/10 min (ASTM D1238), in an amount from 5 to 25 parts by weight per 100 parts of the combined weight of triblock copolymer, polyisobutene and polymonoolefin so that the hardened blend typically exhibits three Tgs. A preferred poly(mono)olefin is a homo- or copolymer of an α-βmonoolefin having from 2 to 8 carbon atoms; polypropylene having a melt index in the range from about 5 to 35 gm/10 min is most preferred.

The basic blend for a usable thin seal may be tacky; though usable as a seal for a vial containing an injectable drug, or for an inner liner for a conventional package or drum, the seal is detackified for general use as a cap liner. It is essential that, for general use, the "detackified seal" contain an effective amount of detackifier sufficient to remove undesirable tackiness and facilitate handling, most preferably from 1 to about 10 parts by weight of a detackifier based on 100 parts by weight of block copolymer. In addition, the detackified blend may contain one or more fillers, processing aids and/or stabilizers including in addition, a "tailoring additive" such as an antioxidant and/or antiozonant, release agent and the like.

The Plasticizer

Since polyisobutenes having Mn lower than 500 are found to be relatively ineffective to decrease oxygen permeability significantly, polyisobutenes having Mn greater than 500 but lower than that at which the polyisobutene is a solid at 100° C. though in a fluid state during melt-blending, are preferred. Commercially available Indopol H-1500, Panalene H-300E and Indopol L-100 polyisobutenes are essentially homopolymers of isobutene having Mn in the range from about 1000 to 5000 which are most preferred, though copolymers which have a small enough butene content, less than 40% of the copolymer, typically from about 1 to 20% may also be used if fluidizable during melt-blending.

The Polyolefin Melt Index Modifier or Hardener

The polyolefin melt index modifier or hardener is preferably a homopolymer of a monoolefin having from 2 to 8 carbon atoms, preferably an α-β monoolefin having from 2 to 4 carbon atoms, or a copolymer of one of the foregoing with one or more of the others. The homo- or copolymer substantially crystalline resin may be blended with a minor proportion by weight of an olefinic rubber which when melt-blended with the homo- or copolymer fails to be vulcanized, that is, is substantially free of links between the double bonds of the polyolefin resin and those of the olefinic rubber. Preferred is a TPE melt-blended with from about 5 to 40% by weight of polyethylene or polypropylene homopolymer.

The Detackifier:

When the basic blend is too tacky it is detackfied with a detackifier which is effective in an amount which will not affect the desired physical properties substantially, in particular which will not increase or decrease the hardness of the non-detackified blend by 10 points on the Shore A scale. Fatty acid amides, waxes and metal stearates are commonly used detackifiers which bloom to the surface, and preferred is a liquid which fails to contribute a Tg to the detackified blend, such as a silicone oil or epoxidized vegetable oil, typically epoxidized soybean or castor oil. Most preferably not more than 10 phr of detackifier (parts per 100 parts by weight of TPE) is used. As little as 0.1 part of such detackifier may provide adequate removability but in general, from 1 to 10 phr (parts per 100 parts by weight of TPE) is used.

Additional Modifiers:

The desired product may include fillers, processing aids, stabilizers, antioxidants and release agents such as a fatty acid amide, e.g. stearyl stearamide. Desirable hardness and stability may be contributed by the addition of a small amount of an engineering plastic which is compatible with the basic blend under processing conditions. A preferred engineering thermoplastic is selected from the group consisting of a polyamide and ethylene vinyl alcohol present in an amount less than 10–100 phr.

In a laboratory procedure for preparing the basic blend, 1 Kg of SBS flake is poured into a Henschel high intensity mixer and mixing started. While mixing, the desired amount of polyisobutene is gradually uniformly dispersed throughout the mass of flakes and sorbed into them over a period of about 2 mins so that they are not oily to the touch. The hardener and remaining ingredients are then added and mixing continued for about an additional 3 min to ensure that the ingredients are homogeneously distributed in the rubber and the temperature of the mass is in the range from about 70° C. to 120° C.

The mass of elastomer flakes are fed to the hopper of a Leistritz LSM 34 twin-screw extruder having a 34 mm diameter screw and a L/D ratio of 34. Three zones are maintained in the barrel to melt-blend and extrude the elastomer. The temperature in the first zone ranges from 150° C. to 190° C.; in the second zone from 160° C. to 210° C.; and in the third zone from 190° to 220° C. The time during which the TPE stayed in the barrel range from about 1 min to 10 min.

The polyisobutene-plasticized TPV is prepared in a conventional manner except that the mineral oil usually used is substituted with polyisobutene oil.

Permeability of a thin molded plaque of film to oxygen is measured in an Oxtran 2/20 instrument made by Mocon Co. A plaque 1250 mm×1500 mm, 0.7 mm thick is molded from a sample of a blend for which permeability is to be measured. All testing is carried out at 23° C. and 0% relative humidity (RH), unless the transmission rate is desired for water vapor; in that case the RH is 90%. Pure nitrogen is flowed over one (first) face of the plaque and pure oxygen is flowed over the opposite (second) face. The effluent nitrogen from the second face is led through an oxygen detector which quantifies the concentration of oxygen. After sufficient time has elapsed for the concentration of oxygen to reach an equilibrium value, the concentration of oxygen at equilibrium is used to compute the volume which would flow through a 1 mil (2.54 µm) thick plaque during 24 hr at 1 atm. All tests for permeability reported hereunder are carried out at 23° C. and 0% RH.

In the following illustrative examples, all references to "parts" are to "parts by weight". All blends were produced in a 2" diameter staged, single step twin-screw extruder in which three zones in the barrel were maintained at temperatures in the range from 160° C. to 200° C. in the first zone, 170° C. to 200° C. in the second zone, and 180° C. to 200° C. in the third zone. The time during which the blend stayed in the barrel range from about 30 sec to 10 min.

Figure 2:
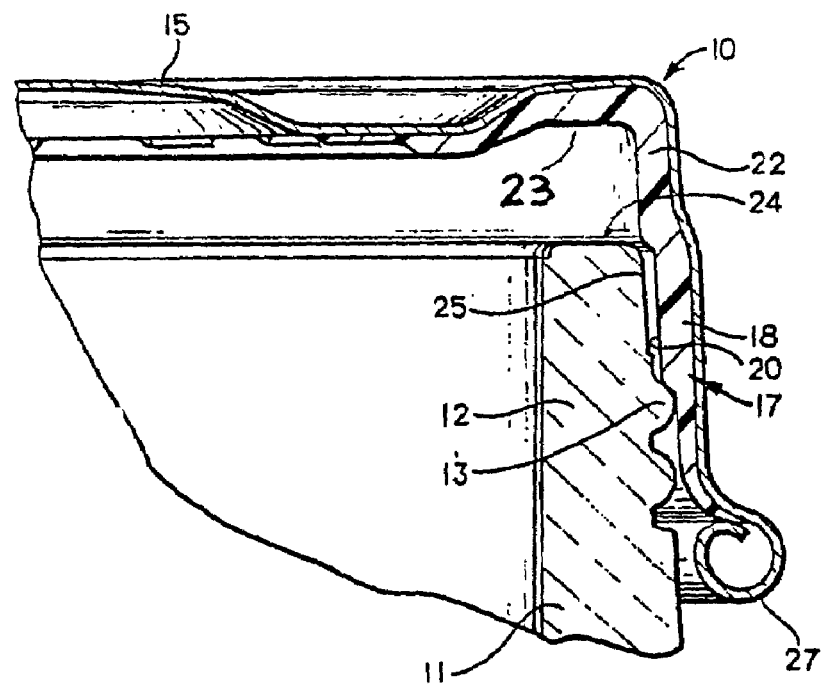
FIG. 2 is a fragmentary sectional view of FIG. 2 showing how permeation rate is reduced to being negligible by requiring gas to traverse the vertical distance of the side walls of the cap.

Referring to FIGS. 1 and 2 there is illustrated a conventional cap 10 for a bottle 11 having a mouth defined by a cylindrical wall 12 which is threaded on its outer surface. The cap is made of metal and includes a base wall 15 and a peripheral wall 16 having a rolled flange with a rolled end 27 at its free end. A gasket 17 of the polyisobutene-plasticized blend is cast in situ and extends along the inner surface of the wall 16 which is threaded tightly fitted to the mouth of the bottle. The annular portion 18 of the gasket provides an effective seal against leakage, and a comparable seal may be provided if the thickness of the gasket at 20 is such that the surface 20 bears against the outer surface 25 of the bottle. Any oxygen permeating through the gasket is required to traverse the vertical distance between the point of contact at 13 and the periphery of the mouth of the bottle. The vertical section 22 may be foreshortened so that the inner surface 23 of the upper portion of the gasket lies against the horizontal upper surface 24 of the mouth.

Alternatively, a conventional cap liner may be in-shell-molded using the polybutene-plasticized blend and substituted for the gasket so that the cap liner is tightly secured against the horizontal upper surface 24 of the mouth.

Figure 3:
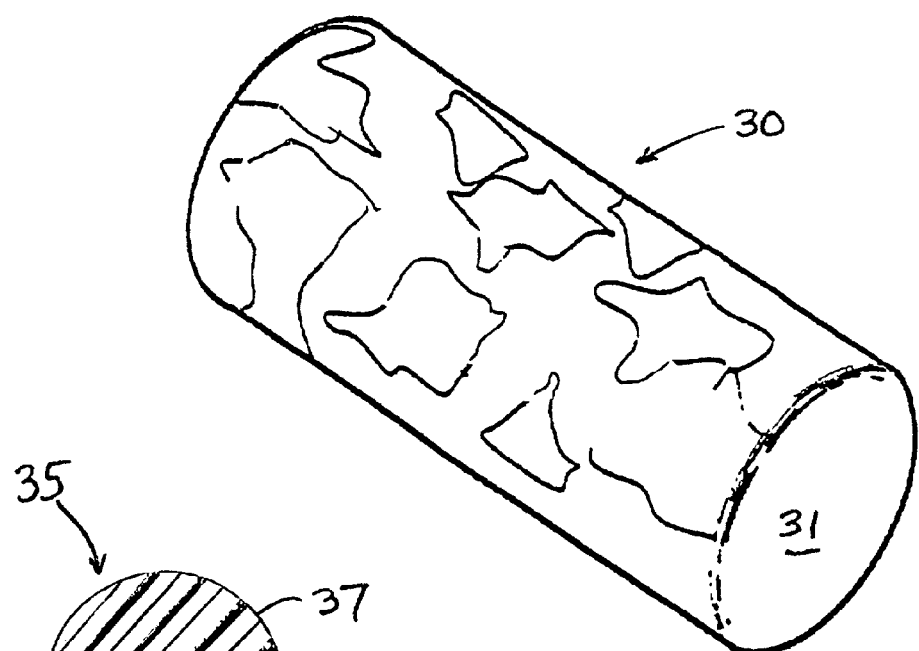
FIG. 3 is an isometric view diagrammatically illustrating a molded plug or "cork" such as is conventionally used to cork a wine bottle.

Referring to FIG. 3 there is illustrated a generally cylindrical plug, indicated generally by reference numeral 30, molded to tightly fit in the mouth of a bottle (not shown) so that one end-face 31 of the plug may be exposed to the atmosphere while the opposed end-face (not shown) will contact the contents of the bottle. The cork may be mottled to give the appearance of natural cork, by mixing differently pigmented polyisobutene-plasticized blends.

Figure 4:
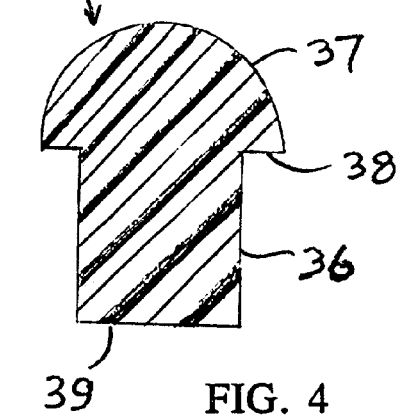
FIG. 4 is a elevational cross-section view of another embodiment of a conventional molded stopper or "cork" for a wine bottle.

Illustrated in FIG. 4 is another conventional embodiment of a "cork" 35 molded from polyisobutene-plasticized TPE to have a generally cylindrical or slightly tapered plug portion 36 and a generally hemispherical cap portion 37 at one end of the plug portion. The off-set 38 of the base of the cap portion on either side of the plug portion 36 is adapted to overlie the horizontal surface of the rim (not shown) of the bottle to be stoppered. The face 39 of the plug portion may be of larger diameter than the distal portion of the plug so as to provide a taper, if desired.

Figure 5:
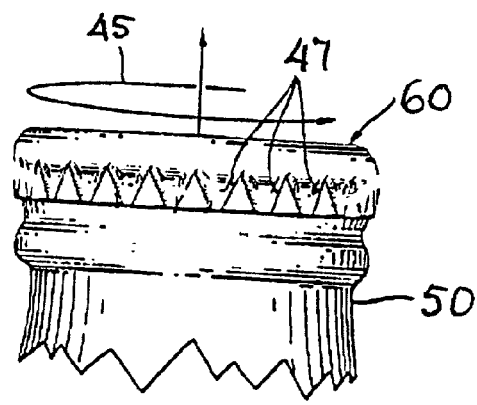
FIG. 5 is an elevation view of a metal closure for a syringe vial over the mouth of which the closure is secured in essentially gas-tight relationship.
Figure 6:
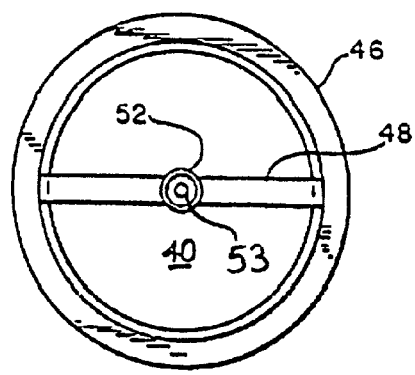
FIG. 6 is a top plan view of the metal closure of FIG. 5.

Referring to FIGS. 5 and 6 there is illustrated a conventional syringe vial having a neck 50 to which a metal closure 60 is tightly secured. The metal closure is a ring 46 having pendant serrations 47 in uniformly spaced-apart relationship with each other around the entire periphery of the ring.

Diametrically opposite portions of the ring are connected with a metal strip 48 in which is provided a disc 52 having an aperture 53 in it. A generally cylindrical septum 40 about 1 mm thick, formed of polyisobutene-plasticized TPE, is tightly held near its periphery, between the ring 46 and the surface of the rim of the vial, when the ring is deformed around the mouth of the vial and the serrations pressed tightly inwardly against the neck 50. A needle of a hypodermic syringe may be readily inserted through the aperture 53 and the septum 40 to withdraw contents of the vial. A twisting motion in the horizontal plane, as illustrated by the arrow 45 on the ring can loosen the ring sufficiently to remove the metal closure 60 in the vertical direction.

The Thermoplastic Elastomer:

It is essential that the deformable polyisobutene-plasticized TPE be "soft" as stated above, and stable to degradation under storage conditions for at least one year.

SBS copolymers which satisfy these conditions are preferred starting materials. Techniques for their preparation are well known in the art. See the text "Block Copolymers" by D. C. Allport and W. H. Janes, Applied Science Publisher Ltd., London (1973). The block copolymer is preferably an anionically polymerized addition polymer of a monovinylaromatic hydrocarbon which provides end-blocks, and either (i) a conjugated diene or (ii) an α-β monoolefin having 2 to 4 carbon atoms, which provides the mid-block ("M-block"). Though tetrablock and higher block copolymers may be used, a triblock copolymer with styrene end-blocks ("S-blocks") having Mn in the range from about 50,000 to 150,000 is uniquely adapted for the purpose. When the M-block is polyolefin, the olefin is most preferably isoprene, butadiene, ethylene, propylene, and/or butylene, and the M-block has Mn preferably in the range from about 50,000 to 700,000. Most preferred is a triblock copolymer in which the ratio of M-block/S-block is in the range from 20/80 to 40/60 and at least 70%, and preferably more than 85% of the double bonds are hydrogenated.

Hydrogenated and non-hydrogenated triblock copolymers are commercially available from Asahi, Kurary, Dexco and Phillips, for example as Kraton G 1650, Kraton G 1651, Kraton G 1654, Septon 8004, Dynaflex GS6771- 000, Dynaflex GX6768-1000, and the like.

Usable TPVs are vulcanizable blends of from 10 to 50 parts by weight ("wt"),preferably 20 to 50 parts by wt, of a crystalline α-olefin polymer having a repeating unit with from 2 to 4 carbon atoms, and from 90 to 50 parts by weight, preferably 80 to 50 parts by wt of a rubber copolymer, as exemplified by commercially available Santoprene® resins.

The crystalline polyolefin is either a homopolymer of an α-olefin having from 2 to 4 carbon atoms, or a copolymer of two or more of such α-olefins. Preferred are polyethylene (PE) or polypropylene (PP), although copolymers of either ethylene or propylene with a minor amount of a higher alpha olefin can be used. Polypropylene is most preferred. The crystalline nature of the polyolefin provides desirable properties such as high tensile strength and thermoplasticity to the blends.

Rubbers useful in the blends include butyl rubber, halobutyl rubber, EPDM and EPR (ethylene/propylene rubber) rubber, acrylonitrile/butadiene rubber (NBR) and natural rubber. Combinations of two or more rubbers of different types can also be used. TPVs described in the following U.S. patents, the disclosures of which are herein incorporated by reference: U.S. Pat. Nos. 4,104,210; 4,130,534; 4,130,535; 4,299,931; and 4,311,628; inter alia, can be effectively plasticized with polyisobutene. Particularly useful are blends of crystalline polyolefin plastics and partially cured rubbers, such as those described in U.S. Pat. Nos. 3,806,558 and 3,862,056, and blends of crystalline polyolefins and uncured EPR or EPDM rubber. Typically, the softer, flexible grades of TPVs are preferred, which have high ratios of rubber to polyolefin, such as from 65:35 up to 85:15. The TPVs, like SBSs may optionally contain other ingredients, including oils, waxes, fillers, colorants, antidegradants and the like.

In the following Table 1, equal parts of S-B-S triblock copolyrner (Septon 8004) and polyisobutene (Panalene H-300) oil are used in a basic blend which is compared to a blend with the same ingredients except that the polyisobutene oil is replaced with the same amount of mineral oil.

TABLE 1

| Ingredient | Blend A | Blend B | Prior art blend |
| --- | --- | --- | --- |
| Septon 8004 SEBS* triblock | 100 | 100 | 100 |
| Panalene H-300* polyisobutene oil | 100 | — | — |
| Indopol L-100 polyisobutene oil | — | 100 | — |
| Mineral oil, Mn = 600 | — | — | 100 |
| Dowlex 2500 polyethylene | 120 | 120 | 120 |
| PA 20 (PE with 30% PIB rubber) | 200 | 200 | 200 |
| Irganox 1010 stabilizer | 1 | 1 | 1 |
| Kemamide E lubricant | 3 | 3 | 3 |
| Hardness, Shore A | 69 | 69 | 69 |

Oxygen permeability (cc.(2.54 gym)/m$^2$.day.atm)
styrene-(ethylene-butene)-styrene triblock Mn = 290,000
*Mn = 1330
Mn = 510

It is evident that the contribution of the polyisobutene oil results in the oxygen permeability being decreased by more than a factor of 2 over the prior art blend containing a mineral oil of comparable Mn. Seals made with mineral oil plasticized block copolymer are deemed satisfactory only for short term storage.

The following examples in Table 2 indicate that increasing the proportion of polyisobutene oil improves the barrier properties of the basic blend, but when a relatively high amount of polyisobutene is used, the blend is too tacky for general use and is therefore detackified.

TABLE 2

| Ingredient | Blend A | Detackified Blends | | | |
| --- | --- | --- | --- | --- | --- |
| Septon 8004 SEBS* triblock | 100 | 100 | 100 | 100 | 100 |
| Panalene H-300* polyisobutene oil | 130 | 130 | 140 | 160 | 170 |
| F040 PP (melt flow 4) | 54 | 54 | 54 | 54 | 54 |
| Dow Corning 200 silicone oil | — | 2.33 | 2.33 | 2.33 | 2.33 |
| Irganox 1010 stabilizer | 0.15 | 0.15 | 0.15 | 0.15 | 0.15 |
| DLTDP antioxidant | 0.30 | 0.30 | 0.33 | 0.33 | 0.33 |
| Kemamide U wax | 2.17 | 2.17 | 2.17 | 2.17 | 2.17 |
| Hardness, Shore A | 72 | 70 | 68 | 61 | 57 |
| Oxygen permeation (cc.mil/m$^2$.day.atm) | 1580 | 1580 | 1380 | 1250 | 1110 |

The following examples in Table 3 indicate the effect of polyisobutene substituted for a mineral oil of equivalent Mn in a TPV; and compares the effect of increasing the polyisobutene used.

TABLE 3

| Ingredient | Plasticized Blends | | |
|---|---|---|---|
| | A | B | C |
| Kelprox PP-09 TPV¤ | 100 | 100 | 100 |
| Mineral Oil, Mn = 600 | 40 | — | 30 |
| Indopol H-300 | — | 40 | 10 |
| Fina 3860X | 6.25 | 6.25 | 6.25 |
| Kemamide U wax | 1.45 | 1.45 | 1.45 |
| Kemamide E | 4.34 | 4.34 | 4.34 |
| Irganox 1010 antioxidant | 0.01 | 0.01 | 0.01 |
| Hardness, Shore A | 64 | 48 | 67 |
| Oxygen permeation (cc.mil/m².day.atm) | 42,000 | 18,000 | 27,000 |

¤with no plasticizer
*polypropylene melt index 100 gm/10 min (ASTM D1238)

It is evident that substitution of mineral oil by polyisobutene decreases the oxygen-permeability by 52%, more than half; replacing only 25% of the mineral oil with polyisobutene decreases the oxygen-permeability by 35%.

Having described the SBS and TPV blends and the overall process of making and using them, and having illustrated the best mode with specific examples of how the blends provide products which effectively seal a container against gas-leakage either into or out of the container, it will be evident that the blend may be used in a wide choice of combinations depending upon the demands of a particular application; and, that the blends provide an economical and effective solution to a difficult problem. It is therefore to be understood that no undue restrictions are to be imposed by reason of the specific embodiments illustrated and discussed, and particularly that the invention is not restricted to a slavish adherence to the details set forth herein.

I claim:

1. A plasticized sealant against diffusion of oxygen, the sealant consisting essentially of a thermoplastic elastomer free of tackiness selected from the group consisting of (a) an at least partially hydrogenated polyblock copolymer of a vinylaromatic compound and a conjugated diene, so as to include a block of a mono(lower)olefin, the olefin having from 2 to 4 carbon atoms, and, (b) a thermoplastic vulcanizate, wherein (a) is block copolymer having vinylaromatic end-blocks and a mid-block selected from the group consisting of polyisoprene, polybutadiene, and hydrogenated copolymers thereof,
(a) having uniformly distributed therewithin,
from 5 to 150 phr, based on 100 parts by weight of (a), of a polymer of an olefin having from 2 to 4 carbon atoms, the polymer having a melt index in the range from 0.2 to 200 gm/10 min at 230° C. and 2.16 Kg load, combined with from zero to an equivalent amount by weight of a mono(lower)olefinic rubber having Mn greater than 200,000, and
(a) and (b) having blended therein from 20 to 180 phr of a liquid polyisobutene oil plasticizer, based on 100 parts by weight of (a) and (b), having a number average molecular weight ("Mn") in the range from 200 to 6000, fluidizable under melt-blending conditions of (a) and (b), the polyisobutene selected from the group consisting of (i) a homopolymer of polvisobutylene and (ii) a copolymer of isobutene and butene, butene repeating units being present in a minor molar proportion, the amount of polyisobutene oil to provide the plasticized sealant with a hardness in the range from Shore A 40 to 80 and an oxygen-permeability less than 20,000 cc. (2.54 μm)/m².day.atm at 23° C. and,
a compatible amount, from 1 to about 20 phr of a detackifier per 100 parts by weight of (a),
(a) having Mn in the range from about 40,000 to 1,100,000 and (b) having a Shore A hardness in the range from 30 to 100, tensile strength at 100% elongation in the range from about 0.5 to 10 MPa and specific gravity in the range from 0.9 to 0.99.

2. The sealant of claim 1 having a thickness in the range from 0.1 mm to 10 mm.

3. The sealant of claim 1 wherein the elastomer is (a) and the sealant has distinct Tgs for each of three phases, attributable to (a) a vinylaromatic hydrocarbon phase, (b) a conjugated diene, optionally hydrogenated, phase, and (c) a polyolefin phase.

4. The sealant of claim 1 wherein the elastomers (a) and (b) have homogeneously distributed therewithin, from 30 to 150 phr of polyisobutene, based on 100 parts by weight of (a) or (b), including in addition from 1 to 5 phr, based on 100 parts by weight of (a) or (b), of an additive selected from the group consisting of a non-reinforcing non-reactive filler, stabilizer, processing aid, antiblocking aid, antistatic agent, wax, foaming agent, pigment, and flame retardant.

5. The sealant of claim 1 wherein (a) is a triblock copolymer, the vinylaromatic end-blocks are polystyrene, and the mid-block is selected from the group consisting of poly(isoprene) and poly(butadiene), and hydrogenated forms thereof in heterogeneous relative order, including styrene-ethylene-butylene-styrene.

6. The sealant of claim 5 wherein the vinylaromatic end-blocks are polystyrene and the mid-block is selected from the group consisting of polyisoprene and polybutadiene; and the detackifier is selected from the group consisting of a silicone oil and an epoxidized vegetable oil.

7. The sealant of claim 5 having a oxygen-permeability in the range from about 2,000 to 20,000 cc. (2.54 μm)/m².day.atm at 23° C.

8. The sealant of claim 5 wherein (a) has a number average molecular weight in the range from about 70,000 to about 500,000.

9. The sealant of claim 5 wherein (b) has a number average molecular weight in the range from about 70,000 to about 500,000.

10. The sealant of claim 1 wherein (b) is a blend of polypropylene and ethylene-propylene diene monomer rubber.

11. A closure means consisting essentially of an elastomeric sealing element free of tackiness having a thickness in the range from about 0.1 mm to about 10 mm, held in removably sealing relationship within the closure means, for sealing a container against permeation of an oxygen-containing gas, wherein the sealing element consists essentially of a thermoplastic elastomer free of tackiness selected from the group consisting of (a) an at least partially hydrogenated polyblock of a vinylaromatic compound and a conjugated diene so as to provide a block of a mono(lower)olefin, the olefin having from 2 to 4 carbon atoms, and, (b) a thermoplastic vulcanizate, wherein (a) is block copolymer having vinylaromatic end-blocks and a mid-block selected from the group consisting of polyisoprene, polybutadiene, and hydrogenated copolymers thereof,
(a) having uniformly distributed therewithin,
from 5 to 150 phr, based on 100 parts by weight of (a), of a polymer of an olefin having from 2 to 4 carbon atoms, the polymer having a melt index in the range from 0.2 to 200 gm/10 min at 230° C. and 2.16 Kg load, combined with from zero to an equivalent amount by weight of a mono(lower)olefinic rubber having Mn greater than 200,000, and (a) and (b) having blended therein from 20 to 180 phr of a liquid polyisobutene oil plasticizer, based on 100 parts by weight of (a) and (b), the plasticizer having a number average molecular weight ("Mn") in the range from 200 to 6000, fluidizable under melt-blending conditions of (a) and (b), present in an amount in the range from about 20 to 180 phr, per 100 parts of (a) and (b), the polyisobutene selected from the group consisting of (i) a homopolymer of polyisobutylene and (ii) a copolymer of isobutene and butene, butene repeating units being present in a minor molar proportion;

the amount of polyisobutene oil being sufficient to provide the elastomeric sealing element with a hardness in the range from Shore A 40 to 80 and an oxygen-permeability less than 20,000 cc. (2.54 μ/m².day.atm at 23° C.; and a compatible amount, from 1 to about 20 phr of a detackifier per 100 parts by weight of (a), (a) having Mn in the range from about 40,000 to 1,100,000; and, (b) having a Shore A hardness in the range from 30 to 100, tensile strength at 100% elongation in the range from about 0.5 to 10 MPa and specific gravity in the range from 0.9 to 0.99.

12. The closure means of claim 11 wherein the sealing element is light-permeable.

13. The closure means of claim 11 wherein the closure means is a bottle cap and the container is a bottle.

14. The closure means of claim 11 wherein the plasticizer is present in an amount in the range from about 30 to 150 phr, per 100 parts of (a) and (b), the closure means is a stopper and the container is a bottle.

15. A method for providing an essentially oxygen-impermeable elastomeric sealing element free of tackiness comprising blending an elastomer selected from the group consisting of (a) an at least partially hydrogenated polyblock of a vinylaromatic compound and a conjugated diene polyblock copolymer, so as to include a block of a mono(lower) olefin, the olefin having from 2 to 4 carbon atoms, and, (b) a thermoplastic vulcanizate, wherein (a) is block copolymer having vinylaromatic end-blocks and a mid-block selected from the group consisting of polyisoprene, polybutadiene, and hydrogenated copolymers thereof, wherein (a) has uniformly distributed therewithin, from 5 to 150 phr, based on 100 parts by weight of (a), of a polymer of an olefin having from 2 to 4 carbon atoms, the polymer having a melt index in the range from 0.2 to 200 gm/10 min at 230° C. and 2.16 Kg load, combined with from zero to an equivalent amount by weight of a mono(lower)olefinic rubber having Mn greater than 200,000, and (a) and (b) having blended therein a liquid polyisobutene oil plasticizer having a number average molecular weight ("Mn") in the range from 200 to 6000, fluidizable under melt-blending conditions of (a) and (b), present in an amount in the range from about 20 to 180 phr, per 100 parts by weight of (a) and (b), the polyisobutene selected from the group consisting of (i) a homopolymer of polyisobutylene and (ii) a copolymer of isobutene and butene, butene repeating units being present in a minor molar proportion and, a compatible amount, from 1 to about 20 phr of a detackifier per 100 parts by weight of (a);

(a) having Mn in the range from about 40,000 to 1,100,000; and, (b) having a Shore A hardness in the range from 30 to 100, tensile strength at 100% elongation in the range from about 0.5 to 10 MPa and specific gravity in the range from 0.9 to 0.99; and, thermoforming a seal having a hardness in the range from about Shore A 40 to 80 and an oxygen permeability less than 20,000 cc. (2.54 μm)/m².day.atm at 23° C.

* * * * *